US011164019B1

(12) United States Patent
Ryan et al.

(10) Patent No.: US 11,164,019 B1
(45) Date of Patent: Nov. 2, 2021

(54) OBJECT DETECTION FOR EVENT CAMERAS

(71) Applicant: FotoNation Limited, Galway (IE)

(72) Inventors: Cian Ryan, Galway (IE); Richard Blythman, Galway (IE); Joe Lemley, Galway (IE); Amr Elrasad, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/904,122

(22) Filed: Jun. 17, 2020

(51) Int. Cl.
*G06K 9/00* (2006.01)
*G06K 9/32* (2006.01)
(Continued)

(52) U.S. Cl.
CPC ..... *G06K 9/00832* (2013.01); *G06K 9/00228* (2013.01); *G06K 9/3233* (2013.01); *G06K 9/6217* (2013.01); *G06T 3/40* (2013.01); *G06T 5/50* (2013.01); *G06T 7/20* (2013.01); *G06T 7/70* (2017.01); *G06T 2207/20084* (2013.01);
(Continued)

(58) Field of Classification Search
CPC ........... G06K 2209/21; G06K 9/00771; G06K 9/00805; G06K 9/00832; G06K 9/3233; G06K 9/6217; G06K 9/00228; G06T 2207/10016; G06T 7/215; G06T 7/248; G06T 2207/20081; G06T 2207/30232; G06T 2207/30248; G06T 7/292; G06T 7/136; G06T 7/70; G06T 7/20;
(Continued)

(56) References Cited

U.S. PATENT DOCUMENTS

2011/0293190 A1\* 12/2011 O'Callaghan ............. G06T 7/20
382/197
2015/0310370 A1\* 10/2015 Burry ............... G06Q 10/06316
705/7.26
(Continued)

FOREIGN PATENT DOCUMENTS

EP 3440833 B1 8/2019
WO 2019042703 A1 3/2019
(Continued)

OTHER PUBLICATIONS

Continuous-time Intensity Estimation Using Event Cameras (Year: 2018).*
(Continued)

*Primary Examiner* — Nizar N Sivji (57) ABSTRACT

A method for producing a textural image from event information generated by an event camera comprises: accumulating event information from a plurality of events occurring during successive event cycles across a field of view of the event camera, each event indicating an x,y location within the field of view, a polarity for a change of detected light intensity incident at the x,y location and an event cycle at which the event occurred; in response to selected event cycles, analysing event information for one or more preceding event cycles to identify one or more regions of interest bounding a respective object to be tracked; and responsive to a threshold event criterion for a region of interest being met, generating a textural image for the region of interest from event information accumulated from within the region of interest.

16 Claims, 6 Drawing Sheets

(51) Int. Cl.
  *G06T 5/50* (2006.01)
  *G06T 7/70* (2017.01)
  *G06T 7/20* (2017.01)
  *G06K 9/62* (2006.01)
  *G06T 3/40* (2006.01)
(52) U.S. Cl.
  CPC .............. *G06T 2207/30196* (2013.01); *G06T 2207/30268* (2013.01)
(58) Field of Classification Search
  CPC ... G06T 3/40; G06T 5/50; G06T 2207/30196; G06T 2207/20084; G06T 2207/30268
  See application file for complete search history.

(56) References Cited

U.S. PATENT DOCUMENTS

| | | | |
|---|---|---|---|
| 2017/0140231 A1* | 5/2017 | Chen | G06K 9/00805 |
| 2019/0147602 A1* | 5/2019 | Tao | G06K 9/00771 382/103 |
| 2020/0005468 A1* | 1/2020 | Paul | G06K 9/6274 |
| 2020/0019802 A1* | 1/2020 | Krishnan | G06K 9/6256 |
| 2020/0175326 A1 | 6/2020 | Shen et al. | |
| 2021/0001862 A1* | 1/2021 | Senechal | G06K 9/00838 |

FOREIGN PATENT DOCUMENTS

| | | |
|---|---|---|
| WO | 2019145516 A1 | 8/2019 |
| WO | 2019145578 A1 | 8/2019 |
| WO | 2019180033 A1 | 9/2019 |

OTHER PUBLICATIONS

Bharath et al.: E-TLD—Long-Term Object Tracking: "Long-term object tracking with a moving event camera", 2018, 12 pages.
Posch, C, Serrano-Gotarredona, T., Linares-Barranco, B., & Delbruck, T. "Retinomorphic event-based vision sensors: bioinspired cameras with spiking output", Proceedings of the IEEE, 102(10), 1470-1484, (2014).
Scheerlinck, C., Rebecq, H., Gehrig, D., Barnes, N., Mahony, R. and Scaramuzza, D., 2020, "Fast image reconstruction with an event camera", in IEEE Winter Conference on Applications of Computer Vision (pp. 156-163).
Lenz G., Leng, S.H. and Benosman, R., "High Speed Event-based Face Detection and Tracking in the Blink of an Eye", arXiv preprint arXiv:1803.10106, 2018, 8 pages.
Barua, S., Miyatani, Y. and Veeraraghavan, A., "Direct face detection and video reconstruction from event cameras", in IEEE Winter conference on applications of computer vision (WACV) (pp. 1-9). IEEE, 2016.
Rebecq, H., Ranftl, R., Koltun, V. and Scaramuzza, D., "High speed and high dynamic range video with an event camera", in IEEE Transactions on Pattern Analysis and Machine Intelligence, 2019, pp. 1-26.
Muhammad Haris, Greg Shakhnarovich, and Norimichi Ukita, "Deep Back-Projection Networks for Single Image Super-resolution", arXiv:1904.05677v1, [cs.CV], Apr. 4, 2019, pp. 1-13.
He, Huang, Chang-Wei, Li, Lingling & Anfu, Guo, "TF-YOLO: An Improved Incremental Network for Real-Time Object Detection",. Applied Sciences 9(16):3225, Aug. 2019, pp. 1-16.
Gehrig, D., Gehrig, M., Hidalgo-Carrió, J. and Scaramuzza, D., "Video to Events: Recycling Video Datasets for Event Cameras", IEEE Conference on Computer Vision and Pattern Recognition (CVPR), Seattle, 2020, pp. 1-10.
Stec, Piotr: "Event-Sensor Camera", U.S. Appl. No. 16/674,378, filed Nov. 5, 2019.
Reinbacher, C, Graber, G, Pock, T. "Real-Time Intensity-Image Reconstruction for Event Cameras Using Manifold Regularisation", arXiv:1607.06283v2 [cs.CV] Aug. 4, 2016, pp. 1-12.
Jin, M., Meishvili, G., Favaro, P. "Learning to Extract a Video Sequence from a Single Motion-Blurred Image", arXiv:1804.04065v1 [cs.CV] Apr. 11, 2018, pp. 1-9.
Scheerlinck, C., Barnes, N., Mahony, R. "Continuous-time Intensity Estimation Using Event Cameras," arXiv:1811.00386v1 [cs.CV] Nov. 1, 2018, pp. 1-23.
Pan, L, Scheerlinck, C., Yu, X., Hartley, R., Liu, M., Dai, Y. "Bringing a Blurry Frame Alive at High Frame-Rate with an Event Camera" arXiv:1811.10180v2 [cs.CV] Nov. 27, 2018, pp. 1-14.
Zaharia, et al.: "Event Camera Hardware" U.S. Appl. No. 17/016,133, filed Sep. 9, 2020.
Chen, G., Hong, L., Dong, J., Liu, P., Conradt, J. and Knoll, A., 2020. EDDD: Event-based Drowsiness Driving Detection through Facial Motion Analysis with Neuromorphic Vision Sensor. . IEEE Sensors Journal.
Angelopoulos, Anastasios & Martel, Julien & Kohli, Amit & Conradt, Jorg & Wetzstein, Gordon "Event Based, Near Eye Gaze Tracking Beyond 10,000Hz", 2020.
Lenz, G., Leng, S.H. and Benosman, R., "Event-based Face Detection and Tracking in the Blink of an Eye", arXiv:1803.10106v3 [cs.CV] Apr. 2, 2019, 9 pages.

\* cited by examiner

OBJECT DETECTION FOR EVENT CAMERAS

FIELD

The present invention relates to a method for producing a textural image from event information generated by an event camera.

BACKGROUND

Imaging with conventional cameras uses a frame-based approach, in which all pixels in an image sensor measure light falling upon them for a given period of time and report their values to image processing circuitry in a synchronous manner. Textured image information for a scene being imaged by the camera is therefore directly available from the image sensor to the image processing circuitry, whereas some post-processing of successively acquired images is required to determine if any objects are moving within a scene.

Cameras based on event-sensors such as disclosed in Posch, C, Serrano-Gotarredona, T., Linares-Barranco, B., & Delbruck, T. "Retinomorphic event-based vision sensors: bioinspired cameras with spiking output", Proceedings of the IEEE, 102(10), 1470-1484, (2014), European Patent No. EP3440833, PCT Application WO2019/145516 and PCT Application WO2019/180033 from Prophesee are based on asynchronously outputting image information from individual pixels whenever a change in pixel value exceeds a certain threshold—an event. Thus, pixels in an "event camera" report asynchronous "event" streams of intensity changes, characterised by x, y location, timestamp and polarity of intensity change.

Events may be generated potentially as fast as the clock cycle for the image sensor and the minimum period of time within which an event may occur is referred to herein as an "event cycle".

Event cameras therefore depart from standard fixed frame rate sampling cameras and measure brightness changes for each pixel independently. Event cameras offer several significant advantages over conventional cameras including i) high temporal resolution (order of microseconds), ii) high dynamic range (140 dB against standard camera 60 dB) and iii) low power consumption.

Event cameras naturally respond to edges in a scene which can simplify the detection of lower level features such as key points and corners. As such, they should be naturally suited to object detection.

For example, event cameras could be particularly useful in driver monitoring systems (DMS) which attempt to locate a driver's face and facial features such as their eyes within a field of view of a camera.

The high temporal resolution of event cameras enables some advanced DMS functionalities beyond the capabilities of standard frame-based cameras. These include low latency eye tracking, blink analysis, faster detection and potentially even crash assessment. Moreover, the high dynamic range of >120 dB supports accurate driver detection under dynamic and extreme lighting conditions.

When employing an event camera, it can still be desirable to reconstruct a textural (or spatial) image using a set of events accumulated over a given time. For example, when a face is being imaged, a reconstructed textural image can be used to determine characteristics such as eye gaze or eye state, such as blink or open, as described in PCT Application WO2019/145578 (Ref: FN-630-PCT), the disclosure of which is incorporated hereby by reference. (It will also be appreciated that wherever spatial image information is available, spectral image information can also be generated.)

There are two main NN-based event camera reconstruction methodologies: E2VID and Firenet discussed in Scheerlinck, C., Rebecq, H., Gehrig, D., Barnes, N., Mahony, R. and Scaramuzza, D., 2020, "Fast image reconstruction with an event camera", in IEEE Winter Conference on Applications of Computer Vision (pp. 156-163).

Figure 1:
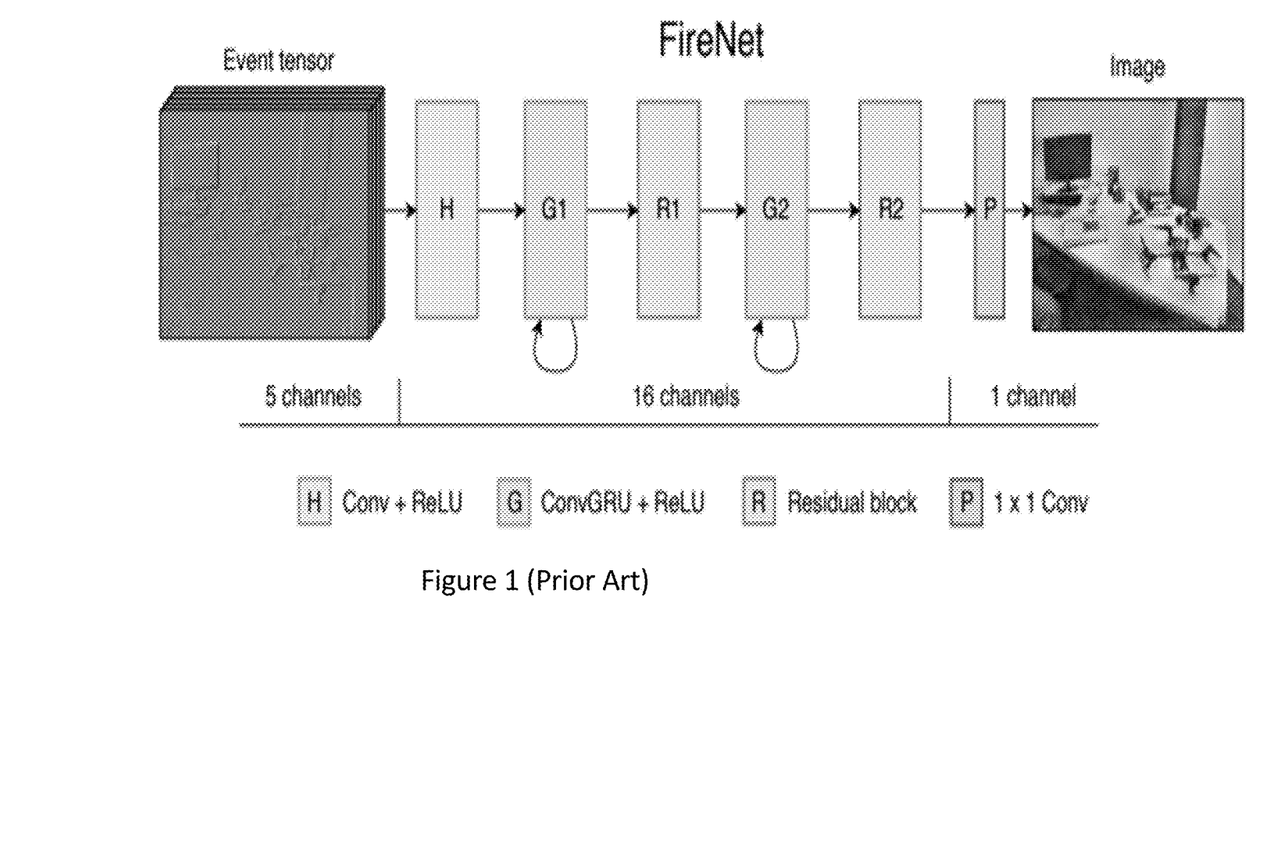
FIG. 1 illustrates an exemplary Firenet network architecture for reconstructing a region of interest from within image from an accumulated number of events generated by an event camera.

The Firenet architecture from Scheerlinck et al is shown in FIG. 1 below and this is slightly smaller than E2VID and thus preferred for embedded applications such as DMS. The main components of the reconstruction architecture are gated recurrent cells, G1, G2, that incorporate information from previous timesteps. The inputs to the network are voxel grids, shown on the left of FIG. 1 as "event tensor". This is essentially a 2D representation where events are shared among a specific number of bins, for example, 5, based on their timestamp. Events occurring in a most recent event cycle are placed in bin 1 whereas oldest events will be in bin 5. As a result, they preserve some temporal information.

It is known that when a given number of events has accumulated, then a textural image of a given resolution can be reconstructed.

However, if movement is occurring in a region of a field of view other than caused by an object of interest, then event information which does not contribute to the quality of the reconstruction will diminish the quality of re-construction.

On the other hand, when an object is necessarily moving (so that it might be detected by an event camera), it may not be possible to detect the location of the object from instantaneous event information alone.

There are few if any datasets for face and eye detection for event cameras and existing research relies on handcrafted features or reconstructing intensity-based images and then applying existing algorithms for example, as described in:

Lenz, G., Ieng, S. H. and Benosman, R., "High Speed Event-based Face Detection and Tracking in the Blink of an Eye", arXiv preprint arXiv:1803.10106, 2018;

Barua, S., Miyatani, Y. and Veeraraghavan, A., "Direct face detection and video reconstruction from event cameras", in IEEE Winter conference on applications of computer vision (WACV) (pp. 1-9). IEEE, 2016; and Rebecq, H., Ranftl, R., Koltun, V. and Scaramuzza, D., "High speed and high dynamic range video with an event camera", in IEEE Transactions on Pattern Analysis and Machine Intelligence, 2019.

SUMMARY

According to the present invention there is provided a method for producing a textural image from event information generated by an event camera according to claim 1.

Embodiments can employ a reconstruction buffer with a spatio-temporal capacity dependent on the dynamics for a region of interest (ROI) being tracked. Once a required number of events have accumulated from within the ROI, an integrated frame comprising those events is created and fed through a reconstruction unit, for example a recurrent neural network (RNN) to generate texture information for the ROI.

The buffer may comprise a sliding window covering a specific number of potential event cycles for a ROI, so fast moving ROI may be limited to providing the required number of events in a relatively short number of event cycles, whereas slower moving ROI may use event information acquired over a greater number of event cycles.

If a sufficient number of events has not occurred in a given sliding window, it is assumed that the state of the ROI, for example, face/eyes, have not changed and thus, reconstructing a new texture image is not warranted.

A separate buffer can be used for different ROIs and so the resulting texture image can provide varying framerates for respective regions of interest within a scene. Thus, faster moving ROIs will be reconstructed at a faster rate and vice versa. The reconstruction of each ROI can be done at a desired resolution (i.e. actual size or smaller, depending on the resolution desired by the downstream task).

In embodiments, a Gated Recurrent-"You Only Look Once" (GR-YOLO) architecture is employed to simultaneously generate region proposals and classify objects in event space. YOLO obtains bounding box coordinates and class probabilities directly from pixel information for a given image.

Embodiments of the present invention provide a neural network based method for detecting objects including a face and eyes in event space.

These embodiments can be employed in driver monitoring systems (DMS) for locating a driver's face and other facial features. In a DMS setting, the face and facial features are the key regions of interest (ROI) and require more attention than other regions of the scene.

The motion of ROIs, such as, face, eye lids and pupils may differ significantly, making it useful to be capable of operating at independent temporal resolutions for respective ROIs. As such, embodiments provide reconstruction of textural information at varying frame rates and resolutions from events for scenes with disproportionate dynamics between different regions of interest.

Embodiments enable a foveated rendering of a ROI being imaged by an event camera, where rendering workload is reduced by reducing the image quality in peripheral or background regions.

Figure 2:
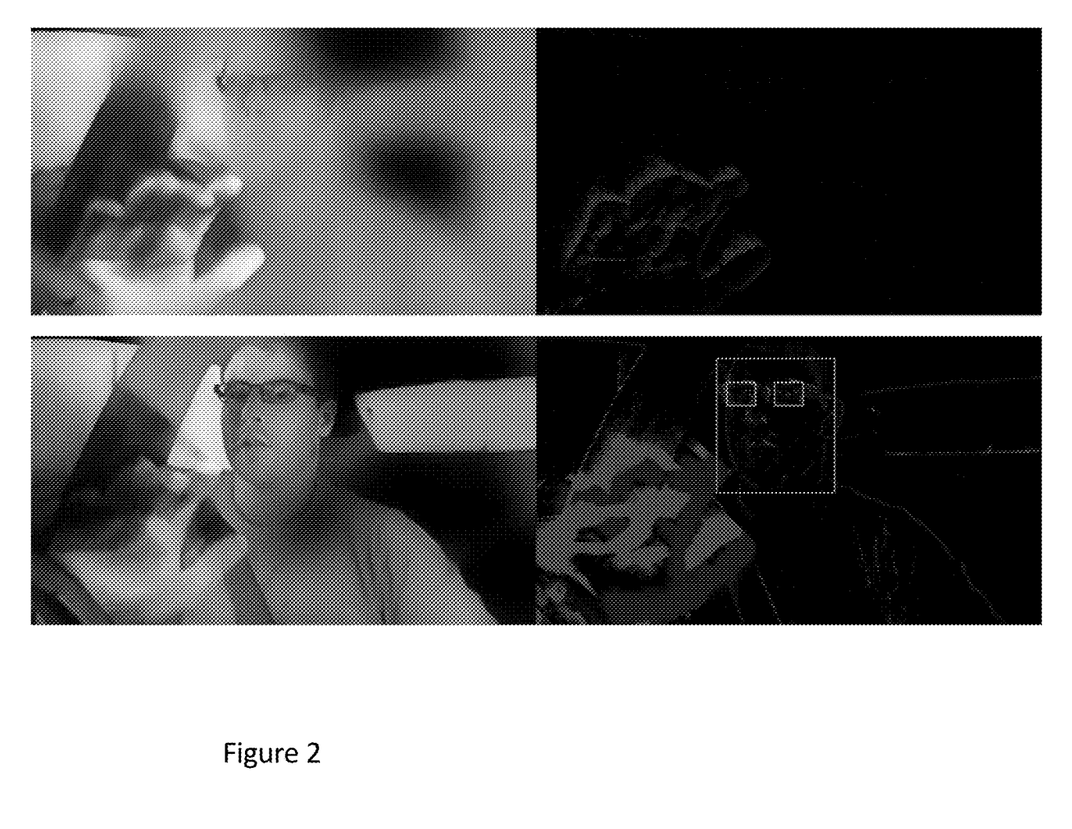
FIG. 2 illustrates a decaying or fading effect (top) due to the motion of a driver's hand, where face reconstruction relies on accumulating enough events (based on the current criteria of fixed number of events) to reconstruct a face and a corresponding textural image (bottom) generated according to an embodiment of the present invention.

Embodiments are capable of generating textural image information from event camera data in spite of a fading or decaying effect associated with event camera information. So referring to FIG. 2, where a DMS system is attempting to track a user's facial features and their hand is moving within the field of view of the camera, event information (top right) from their hand will tend to dilute event information from the camera so affecting the quality of image re-construction (top left). On the other hand, embodiments of the present invention which are capable of detecting ROIs bounding the face and eyes (bottom right) can re-construct the face and eyes at the required speed, quality and resolution against a background which is of less importance (bottom left) with significantly reduced computational cost.

BRIEF DESCRIPTION OF THE DRAWINGS

Embodiments of the invention will now be described, by way of example, with reference to the accompanying drawings in which.

DESCRIPTION OF THE EMBODIMENTS

Figure 3:
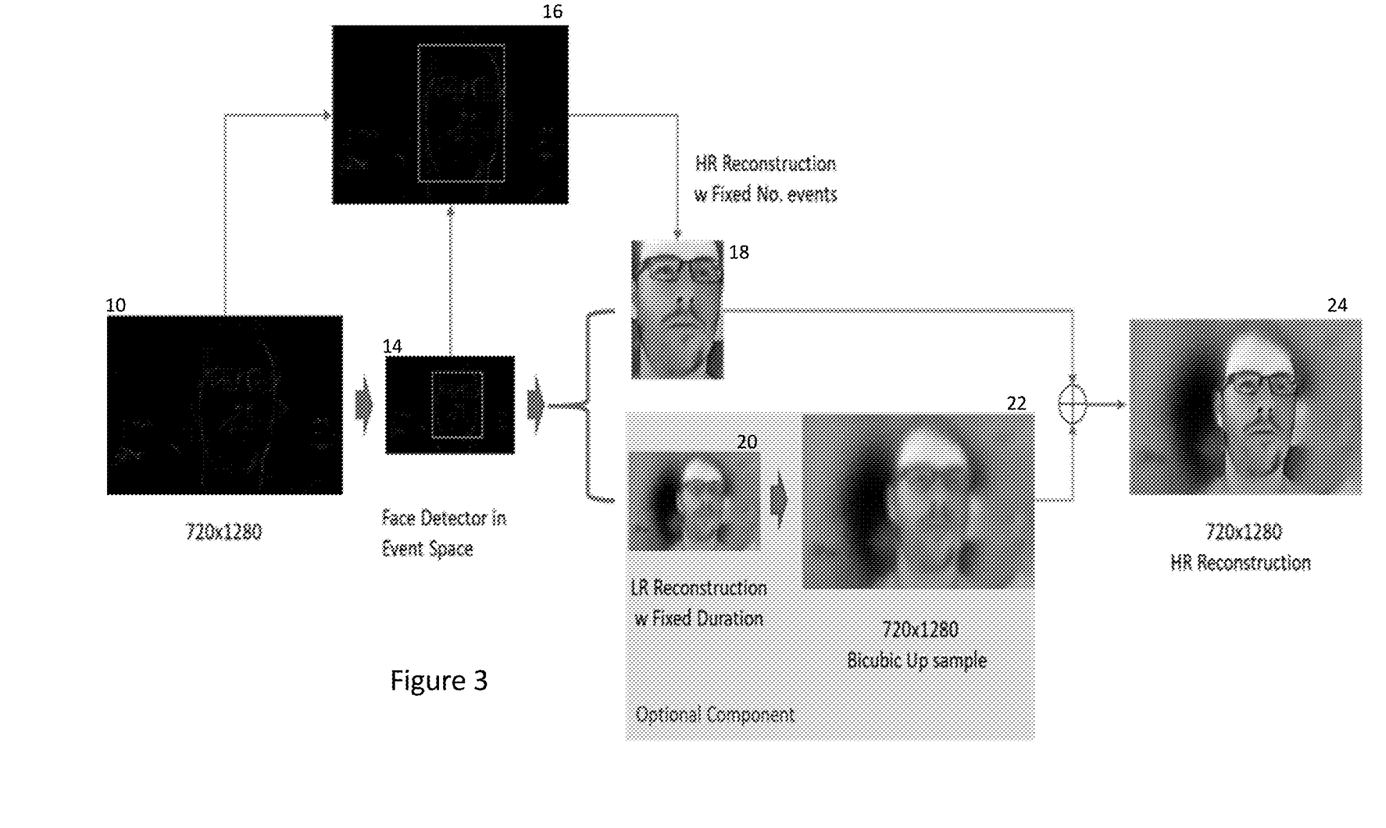
FIG. 3 illustrates a processing pipeline according to a first embodiment of the present invention.

Referring now to FIG. 3, there is shown a flow diagram illustrating the operation of a first embodiment of the present invention.

In the embodiment, an event camera 10, for example, such as available from Prophesee with a pixel resolution of 720×1280 provides event information across of field of view in which an object such as a face including one or more eyes may be present. As discussed, within any given event cycle, event information may only be provided from a limited number of pixels, typically around the edges of the object features.

In the example, events from a monochrome (intensity) event camera are shown and it will be appreciated that such a camera can be sensitive, for example, to visible wavelength light or to near infra-red NIR light where such image information is required.

Equally, embodiments of the invention can be extended operate with multi-plane RGB, RGB-IR or RGB-W event information provided from variants of the camera 10.

The first task performed in the processing pipeline is to respond to this event information and to update the size and location of any object being tracked. In FIG. 3, a face detector 14 provides a bounding box for the most likely size and location of a face within the field of view of the event camera 10. The face detector 14 can also provide bounding boxes for each of the eyes and any other facial features which need to be tracked—although these are not shown in FIG. 3.

An exemplary face detector 14 will be described in more detail below, but in any case bounding box information produced by the face detector 14 is provided to a facial feature reconstruction unit 16.

In one embodiment, the reconstruction unit 16 waits for a given count of events to occur in the vicinity of the respective bounding box for each of any detected face and eyes and once this threshold is met, the unit 16 can reconstruct texture information 18 for the bounding box, for example, using the recurrent neural network (RNN) such as disclosed in Scheerlinck et al and described in relation to FIG. 1.

In an alternative embodiment, the unit 16 could wait for a given number N of event cycles before attempting to reconstruct texture information 18 for the bounding box. In this case, event information would be drawn from a rolling window of N event cycles with event information from temporally distant event cycles becoming redundant.

These implementations could be combined by requiring a given count of events to occur with a given number N of event cycles before reconstructing texture information 18 for the bounding box; or alternatively the reconstruction unit could either attempt to reconstruct texture information 18 whenever a given count of events occurs in the vicinity of the respective bounding box or within N event cycles of having last reconstructed texture information 18—whichever occurs first.

For a large face region and a 720×1280 pixel event camera, a count of between 5000 and 20000 events within a previous N=5 event cycles can provide sufficient detail to reconstruct the texture information 18 for the face within the bounding box. For eye regions, fewer events may be required and according to the sharpness required for the texture image, the events may be drawn from fewer or more recent event cycles.

Note that as the bounding box size and location do not need to be especially accurate, the face detector 14 may operate in a down-sampled space with events from multiple camera pixels being binned together as will be explained in more detail below, whereas the reconstruction unit 16 can operate at the same pixel resolution as the event camera, 720×1280.

It will be appreciated that during the course of accumulating the required count of events before reconstructing the texture information 18 for a ROI, the ROI of interest may shift. Thus, events which occurred around the periphery of the ROI may contribute to the count of accumulated events, but not the final texture information because they might at that instant lie outside the ROI. Similarly, events from a previous event cycle which then occurred outside the ROI may fall within the ROI in the event cycle at which the count is reached. It will be appreciated that as the count is approximate, such variability does not affect the end result greatly. Nonetheless, it will be appreciated that the buffer used for accumulating event information for the ROI needs to be suitably sized to accommodate for movement of the ROI during the course of accumulating the event information which will be used to generate the texture information 18.

Once the reconstructed texture information 18 is available it can be used for a variety of applications.

For example, if desired, the reconstructed texture information can be superimposed on texture information for the background 20 to create a complete textural image 24 for the field of view, with a high resolution in the regions of interest and less detail for the background.

FIG. 3 shows that once a threshold number of events from outside the face region have been detected; or alternatively simply at a relatively slow fixed duration, this event information can be used to generate the background texture 20, again for example using the technique disclosed in Scheerlinck et al and described in relation to FIG. 1.

As the background may be relatively motionless and because its illumination level may be constant, it can be useful to only attempt to generate the background texture 20 at low resolution and then to upsample this to provide the texture information 22 at the required resolution for construction of the image 24. Simple bicubic upsampling may be employed, but in other embodiments, either simpler bilinear upsampling could be used or alternatively other non-linear forms of neural network based super-resolution could be employed, for example Deep Back-Projection Network (DBPN) such as disclosed by Muhammad Haris, Greg Shakhnarovich, and Norimichi Ukita, "Deep Back-Projection Networks for Single Image Super-resolution", arXiv:1904.05677v1, [cs.CV], 4 Apr. 2019.

It will also be appreciated that where the background remains constant for longer than a specified period of time, techniques such as disclosed in U.S. application Ser. No. 16/674,378 Ref: FN-654-US) can be used to cause a change in the light field incident on the surface of the event-sensor and to generate a set of events from pixels distributed across the surface of the event-sensor where this might otherwise have not happened.

As will be seen, the background image 22 may include low quality texture information for the region of interest. When generating the final reconstructed image 24, the texture information 18 can either be directly superimposed on the background information 22 perhaps with some blending around the periphery or the texture information 18 and background information 22 within the ROI can be combined using an averaging or any other suitable function.

Referring back to the face detector 14, in one embodiment, the face (and eye) detector 14 is based on the YOLOv3-tiny network, disclosed in He, Huang, Chang-Wei, Li, Lingling & Anfu, Guo, "TF-YOLO: An Improved Incremental Network for Real-Time Object Detection". Applied Sciences 9(16):3225, August 2019 modified to include a fully convolutional gated recurrent unit (GRU) layer. Nonetheless, it will be appreciated that in variants of the exemplary embodiment other forms of long short-term memory (LSTM) layer than the GRU layer could be used.

An exemplary network architecture is shown in the table below:

| LAYER | TYPE | FILTER | KERNEL/STRIDE | INPUT | OUTPUT |
| --- | --- | --- | --- | --- | --- |
| 0 | Conv | 16 | 3/1 | 256 × 256 × 1 | 256 × 256 × 16 |
| 1 | Maxpool | | 2/2 | 256 × 256 × 16 | 128 × 128 × 16 |
| 2 | Conv | 32 | 3/1 | 128 × 128 × 16 | 128 × 128 × 32 |
| 3 | Maxpool | | 2/2 | 128 × 128 × 32 | 64 × 64 × 32 |
| 4 | Conv | 64 | 3/1 | 64 × 64 × 32 | 64 × 64 × 64 |
| 5 | Maxpool | | 2/2 | 64 × 64 × 64 | 32 × 32 × 64 |
| 6 | Conv | 128 | 3/1 | 32 × 32 × 64 | 32 × 32 × 128 |
| 7 | Maxpool | | 2/2 | 32 × 32 × 128 | 16 × 16 × 128 |
| 8 | Conv | 256 | 3/1 | 16 × 16 × 128 | 16 × 16 × 256 |
| 9 | Maxpool | | 2/2 | 16 × 16 × 256 | 8 × 8 × 256 |
| 10 | Conv | 512 | 3/1 | 8 × 8 × 256 | 8 × 8 × 512 |
| 11 | Maxpool | | 2/1 | 8 × 8 × 512 | 8 × 8 × 512 |
| 12 | Conv | 1024 | 3/1 | 8 × 8 × 512 | 8 × 8 × 1024 |
| 13 | Conv | 256 | 1/1 | 8 × 8 × 1024 | 8 × 8 × 256 |
| 14 | GRU | 256 | 3/1 | 8 × 8 × 256 | 8 × 8 × 256 |
| 15 | Conv | 512 | 3/1 | 8 × 8 × 256 | 8 × 8 × 512 |
| 16 | Conv | 21 | 1/1 | 8 × 8 × 512 | 8 × 8 × 21 |
| 17 | YOLO | | | 8 × 8 × 21 | 192 × 7 |
| 18 | Route 14 | | | | 8 × 8 × 256 |
| 19 | Conv | 128 | 1/1 | 8 × 8 × 256 | 8 × 8 × 128 |
| 20 | Up-Sampling | | | 8 × 8 × 128 | 16 × 16 × 128 |

-continued

| LAYER | TYPE | FILTER | KERNEL/STRIDE | INPUT | OUTPUT |
|---|---|---|---|---|---|
| 21 | Route 8 + 20 | | | | 16 × 16 × 384 |
| 22 | Conv | 256 | 3/1 | 16 × 16 × 384 | 16 × 16 × 256 |
| 23 | Conv | 21 | 1/1 | 16 × 16 × 256 | 16 × 16 × 21 |
| 24 | YOLO | | | 16 × 16 × 21 | 768 × 7 |

In the above embodiment an input reference frame size of 256×256 pixels is used.

Layers 0 . . . 13 comprise a series of convolutional and Maxpool layers and focus solely on information in the reference frame. As will be seen, layers 1, 3, 5, 7 and 9 comprise Maxpooling layers, down-sampling the image resolution by a factor of $2^5=32$, resulting in feature maps of size 8×8. (Each cell corresponds to an 8×8 section of the input reference frame.) As such, in this embodiment, the network 14 can be configured can take any input frame size where the width and height are divisible by $2^5$.

For example, in variations of the above embodiment a reference frame of 288×512 could be used as this more closely reflects the aspect ratio of the Prophesee camera and causes less alising in the down-sampling process.

Note that it is also possible to train the network 14 based on reference frames of one size and to deploy the network to process reference frames of another size, as the weights employed within the various layers are the same in any case.

In any case, any difference in event camera resolution and reference frame resolution, requires events occurring at a resolution of 720×1280 pixels to be binned into reference frame pixels. This can be performed using for example nearest neighbour or interpolation, and it will be appreciated that when potentially combining more than one event occurring in the vicinity of a reference frame pixel, the simple +/−polarity indicators provided by the event camera can convert into potential real valued scalars.

Similar to the technique disclosed in Scheerlinck et al and described in relation to FIG. 1, events from a number of event cycles are accumulated until a threshold number of events for the entire reference frame have occurred. Although, in this case rather than dividing the events into separate time-based channels, they are aggregated into a single channel. The number of events which triggers the network 14 can differ from the number of events determining when the reconstruction unit 16 attempts to reconstruct texture information 18 and will typically be lower.

The GRU is located at layer 14, before a first YOLO detection layer 17, based on empirical performance tests whilst also minimising network size and complexity, but it will be appreciated that in variants of this network the GRU may be placed at other network locations. In this regard, it will be seen that in the above exemplary network, the memory function provided by the GRU layer 14 affects both YOLO detection layers 14 and 17.

In variants of the above embodiment, layer 18 can be connected back to the output from layer 13 (before the GRU layer 14), so that the GRU layer 14 the only affects the large scale YOLO layer 17, whereas the smaller scale YOLO layer 24 is unaffected by the GRU layer 14. This can allow the YOLO layer 14 to respond to potentially relatively faster displacements of smaller scale features less weighted by the GRU layer 14 memory function.

In still further variants, there could be provided respective YOLO layers connected before and after the GRU layer 14 so that the network would be capable of detecting both faster and slower moving features at any given scale.

In a still further variation, respective GRU layers with different weights and so differently tuned to tracking relatively larger and smaller features can be employed.

The GRU inputs and outputs 256 feature maps. The equations governing fully convolutional GRUs are as follows:

$$z_t = \sigma(W_z * x_t + U_z * h_{t-1})$$
$$r_t = \sigma(W_r * x_t + U_r * h_{t-1})$$
$$\tilde{h}_t = \tanh(W * x_t + U * (r \odot h_{t-1}))$$
$$h_t = (1 - z_t)h_{t-1} + z_t \tilde{h}_t$$

where * is the convolution operator, ⊙ is the Hadamard product. $x_t$ is the input at time t, $z_t$ is the update gate, $r_t$ is the reset gate, $\tilde{h}_t$ is the candidate activation, $h_t$ is the output, σ is the sigmoid function and $W_z$, $U_z$, $W_r$, $U_r$, W and U are the learnable weights. (Note that t−1 in this case refers to the previous instantiation of the face detector 14.)

If the reference frame does not contain any face information (which is common), latent space information is propagated through the GRU from previous instances of the GRU within previous instances of the face detector 14, enabling the network to "remember" where the face was not only in the immediately previous timesteps (event cycles) providing event information for the input reference frame, but from one or more previous instances of the face detector 14.

Route layers in the above table indicate forward skip connections with feature map concatenation. Layer 14 routes its 8×8 cell, 256 channel output forward to layer 19 without concatenation; while layer 8 routes its output forward to layer 22. In the latter case, this 256 channel output is concatenated with the 128 channels output from previous layer 20 to provide the 16×16 cell, 384 channel input for layer 22.

Preceding the YOLO detection layers 17 and 24, 1×1 convolution layers 16 and 23 are used. The shape of the kernels is 1×1×(B×(5+C)) where B is the number of predicted bounding boxes and C is the number of classes. B is set to 3 and C is 2 (face+eye). That is, the network predicts 3 bounding boxes at each cell.

YOLO detection layers (layers 17 and 24) make predictions on each cell for each box—YOLO layer 17 producing predictions for large scale 16×16 face/eye features and YOLO layer 24 producing predictions for smaller scale 8×8 face/eye features. At each scale, the network makes predictions for each of the 3 anchors over each cell. This amounts to 6 anchors used over the 2 scales.

Note because of the upsampling layer 20 between layer 17 and 24, layers 22-24 tend to be more computationally expensive than layers 15-17. As layer 17 is a terminal output layer, it is possible to execute layers 19-24 conditionally on the results provided by layer 17. Thus, if layer 17 only produced very low probability results, then it may not be seen as worthwhile to execute layers 19-24. Separately, if not operating conditionally and to reduce latency, as layers 19-24 branch from layer 14, it is possible to execute these layers in parallel with layers 15-17 in a multi-core processor of the type disclosed in in PCT Application WO2019/042703 (Ref: FN-618-PCT), the disclosure of which is incorporated herein by reference.

Each YOLO detection layer 17, 24 predicts box coordinates and dimensions, objectness and class probabilities. Objectness and class probabilities reflect the probability that an object is contained within a bounding box and the conditional probability of a class given an object, respectively.

To make bounding box predictions, the YOLO layers 17 and 24 employ anchor boxes, a set of predefined bounding boxes with set heights and widths. Anchors are essentially bounding box priors. They are configured to capture the scale and aspect ratio of the object classes relating to the current dataset and task at hand. As mentioned, at each cell, 3 anchor boxes are used. So, within a cell, a prediction is made for each anchor, based on the 1×1 convolutions explained above. The output is $(t_x, t_y, t_w, t_h, t_o, p_1, p_2) \times B$ for each grid cell, where $t_o$ reflects objectness i.e. the probability a box contains an object. $p_1$ and $p_2$ represents the probability of each class—in this case face or eye. (In the embodiment, no distinction is made between left and right eyes, but in variants of the embodiment, this could be done.)

Figure 4:
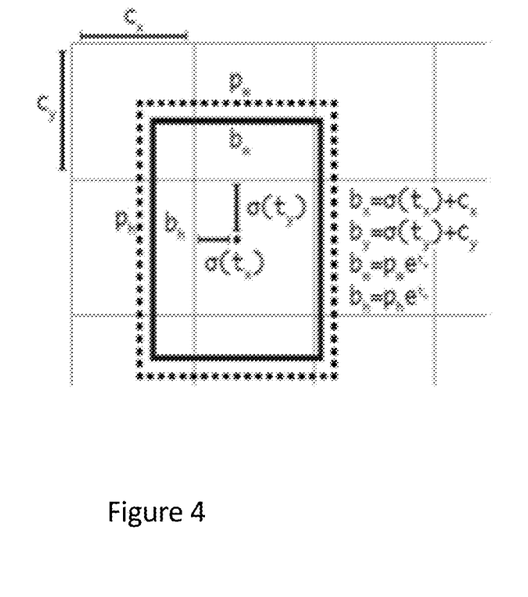
FIG. 4 illustrates the output from a YOLO layer within the face detector of the pipeline of FIG. 3.

As will be seen from the table, input to the YOLO detection layers 17, 24 comprises 21 feature maps: 7×3=21. The 3 relates to the 3 anchor boxes. The 7 relates to x, y centre coordinates, height, width, objectness and 2 class probabilities predicted from the previous 1×1 convolution. With reference to FIG. 4, the equations below describe how this output is transformed to bounding box predictions:

$$b_x = \sigma(t_x) + c_x$$
$$b_y = \sigma(t_y) + c_y$$
$$b_w = p_w e^{t_w}$$
$$b_h = p_h e^{t_h}$$

where $(b_x, b_y, b_w, b_h)$ represent bounding box centre x, y coordinates, width and height, σ signifies the sigmoid function, $p_w$ and $p_h$ are bounding box prior width and height and $c_x$ and $c_y$ are the coordinates of the top left corner of the grid cell. Rather than predict absolute width and height, the model predicts width and height ($t_w$ and $t_h$) as log transforms or offsets to these predefined anchors. Offsets are applied to anchors boxes to create new width and height predictions.

Dimensions are predicted by applying log-space transformations and subsequently multiplying by anchors. Centre coordinate predictions ($t_x$ and $t_y$) represent offsets relative to the top left corner of each cell ($c_x$ and $c_y$). The centre coordinates are transformed using a sigmoid function to force the output between 0-1 and within the cell. Objectness predictions ($t_o$) are also passed through a sigmoid function and interpreted as a probability.

The two network layers 17, 24 produce ((8×8)+(16×16))× 3=960 predictions. Typically, there is only 1 face and 2 eyes in the field of view and so further filtering of the predictions is employed to provide the final bounding box for each of the face and eyes. Filtering is first performed based on objectness scores. Boxes with low objectness probabilities (i.e. <0.6) are removed. In one implementation, non-maximum suppression is then used to further filter overlapping detections of the same object.

The above described network 14 can maintain the face and eye locations over a long period of time when no face information is available.

As a network performing the task of the face detector network 14 has not been made available before, the required large event based dataset required for training the face detector 14 is not readily available, but it can be generated from textural image datasets—either monochrome or RGB. Where a static image dataset such as the Helen dataset (http://www.ifp.illinois.edu/~vuongle2/helen/) is employed, video sequences can be generated from these images by applying a set of random transformations and augmentations each image, simulating homographic camera motion with 6-DOF. Alternatively, video datasets such as the 300VW dataset can be employed.

Figure 5:
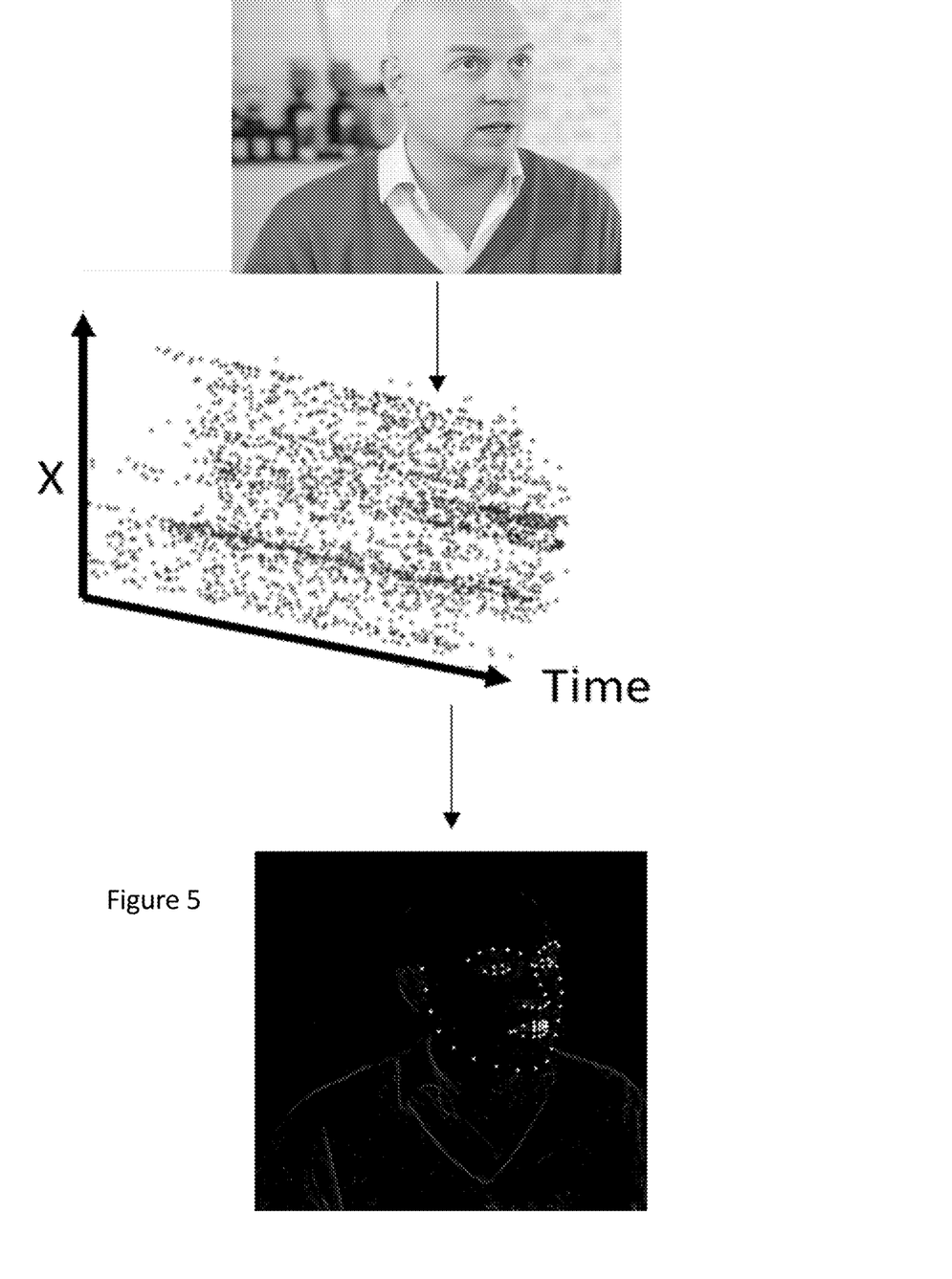
FIG. 5 illustrates a) an image (Intensity, RGB or NIR) from a sequence of images being converted into b) corresponding events and c) those accumulated events subsequently converted over the sequence of images into an integrated event frame with labelled landmarks.

Gehrig, D., Gehrig, M., Hidalgo-Carrió, J. and Scaramuzza, D., "Video to Events: Recycling Video Datasets for Event Cameras" have proposed a framework for converting any existing video datasets to event datasets, mapping labels from the former to the latter. However, they do not explicitly refer to facial landmarks or bounding boxes. They demonstrate their framework for object recognition and sematic segmentation tasks. In any case, facial landmarks defining the outline of the face and eye features such as eyebrows and eyelids which can be determined within the textural images can now be mapped through into event space as shown in FIG. 5 and used for training.

As will be appreciated, in the embodiment of FIG. 3, event information is used directly in the face detector 14 to identify a ROI in event space containing a face as well as ROIs containing facial features such as eyes.

Figure 6:
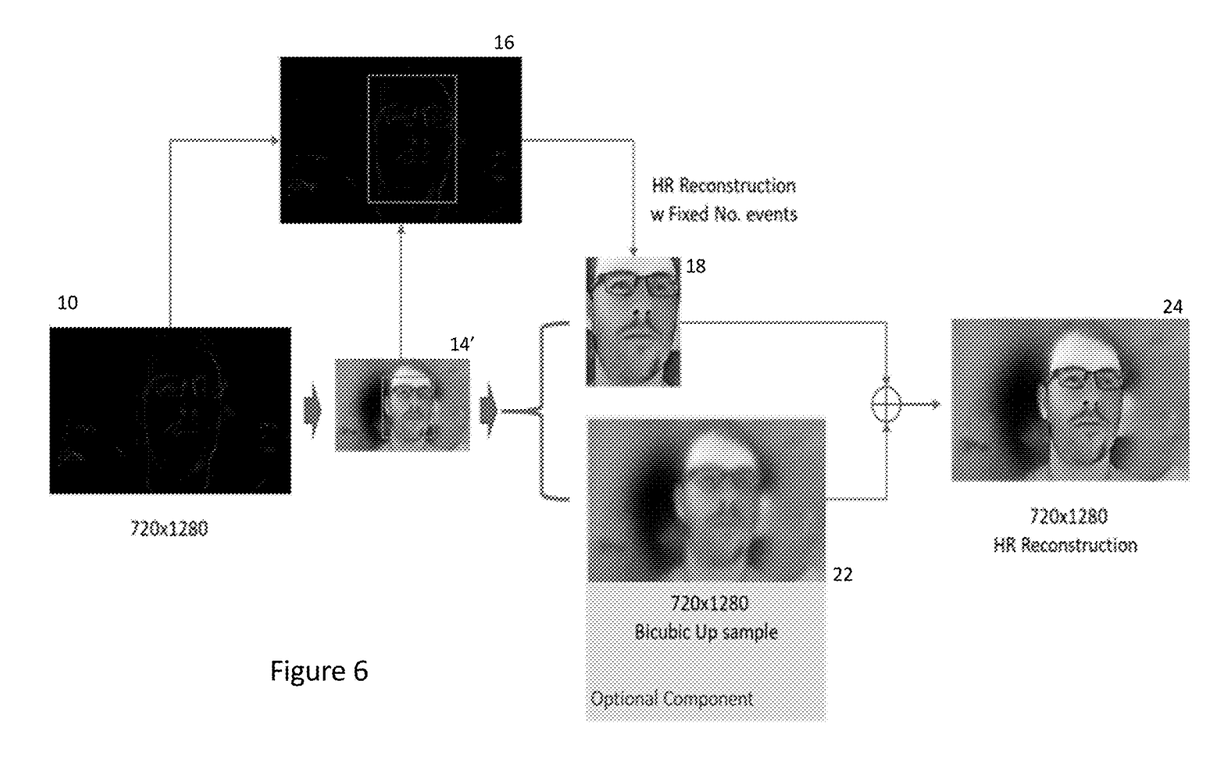
FIG. 6 illustrates an alternative processing pipeline according to a second embodiment of the present invention.

FIG. 6 shows a variation of the embodiment of FIG. 3 where like reference numerals relate to similar functionality. In this case, a face detector 14' is applied to a low resolution reconstructed image of the scene, similar to the textural image 20 generated in the embodiment of FIG. 3. In this case, the face detector 14' can comprise any conventional form of face detector based on either classical Haar classifiers or neural network based classification designed for intensity-based images.

It will be appreciated that using this approach, the face detector 14' may be slower to respond to changes in location of the face and/or eyes and so this reason, the bounding boxes chosen for each may not tightly frame the features as much as in the embodiment of FIG. 3. On the other hand, a greater variety of scale may be available from some conventional classifiers so potentially providing a better fit in some cases.

In any case, the face detector 14' again provides the bounding box information to the reconstruction unit 16 which produces the textural information 18 for the bounding box(es) as before.

Again, as before, the low-resolution textural image 20 of the background can be upsampled before being combined with the high resolution textural information 18 for the face (and facial features) to produce the complete textural image 24 for the field of view, with a high resolution in the regions of interest and less detail for the background.

In variants of the above described embodiments, tracking algorithms incorporating Kalman filters can be employed to further refine the tracking of ROIs detected by the face detectors 14,14'.

Note that although potentially compact, significant processing is still required to execute an instance of the face detector 14, 14'. As such, the face detector 14, 14' may not execute at the same frequency as event cycles. Nonetheless, this may not be necessary as the frequency at which the face detector 14, 14' executes need only be sufficient to track movement of a region of interest. On the other hand, as soon as the threshold number of events and/or event cycles criteria for executing an instance of the reconstruction unit 16 for any given region of interest being tracked is met, this can execute rapidly to provide the required textural information 18 for subsequent analysis.

While the above described embodiment has been provided in the context of driver monitoring systems (DMS), it will be appreciated that it can be extended to other applications where tracking object features from information provided by an event camera is of interest.

The invention claimed is:

1. A method for producing a textural image from event information generated by an event camera comprising:
   accumulating event information from a plurality of events occurring during successive event cycles across a field of view of the event camera, each event indicating an x,y location within said field of view, a polarity for a change of detected light intensity incident at said x,y location and an event cycle at which said event occurred;
   in response to selected event cycles, analysing event information for one or more preceding event cycles to identify one or more regions of interest bounding a respective object to be tracked; and
   responsive to a threshold event criterion for a region of interest being met, generating a textural image for the region of interest from event information accumulated from within the region of interest.

2. The method of claim 1 comprising responsive to identifying a plurality of different regions of interest within the field of view of the event camera, allocating each region a respective threshold event criterion.

3. The method of claim 1 wherein said threshold event criterion includes either: a threshold number of events; a threshold number of event cycles; or a threshold number of events occurring within a threshold number of event cycles.

4. The method of claim 1 wherein said analysing is performed periodically.

5. The method of claim 1 further comprising:
   in response to selected event cycles, generating a background textural image for at least regions outside of said identified one or more regions of interest from event information accumulated for a plurality of preceding event cycles.

6. The method of claim 1 wherein said background textural image is of a lower resolution than said textural image for the one or more regions of interest and wherein said method further comprises: up-sampling said background textural image; and combining said up-sampled textural image with said textural image for the one or more regions of interest to generate a high resolution image for the field of view of the event camera.

7. The method of claim 5 wherein said step of generating said background textural image is performed at a lower frequency than generating a textural image for any of the or each region of interest.

8. The method of claim 1 wherein said analysing comprises:
   in response to selected event cycles, generating a background textural image for the field of view of the event camera at a lower resolution than said textural image for the one or more regions of interest from event information accumulated for a plurality of preceding event cycles; and
   analysing said background textural image to identify said one or more regions of interest.

9. The method of claim 1 wherein said object to be tracked comprises one or both of: a face or eyes.

10. A system comprising an event camera, a memory for accumulating event information generated by the event camera and a processor configured to process said accumulated event information according to a method for producing a textural image from event information generated by an event camera comprising:
    accumulating event information from a plurality of events occurring during successive event cycles across a field of view of the event camera, each event indicating an x,y location within said field of view, a polarity for a change of detected light intensity incident at said x,y location and an event cycle at which said event occurred;
    in response to selected event cycles, analysing event information for one or more preceding event cycles to identify one or more regions of interest bounding a respective object to be tracked; and
    responsive to a threshold event criterion for a region of interest being met, generating a textural image for the region of interest from event information accumulated from within the region of interest.

11. A system according to claim 10 further comprising a face detector configured to perform said analysing, said face detector comprising a convolutional neural network comprising a plurality of convolutional layers, a first of said layers being configured to receive said accumulated event information, successive layers of said network being configured to down sample said accumulated event information into at least one lower resolution feature map comprising an array of cells, at least one intermediate layer being configured to retain information generated by a corresponding layer in a previous instance of said face detector and further comprising at least one transformation layer configured to transform a feature map provided by a previous convolutional layer generate a respective probability for each down-sampled cell of said feature map comprising an object at a given scale.

12. A system according to claim 11 comprising a plurality of said transformation layers, each configured to generate a probability for down-sampled cells of respective feature maps comprising an object at respective scales.

13. A system according to claim 11 wherein each said at least one transformation layer comprises a YOLO layer.

14. A system according to claim 12 further comprising an upsampling layer between a first transformation layer and a second transformation layer so that said second transformation layer operates at a smaller scale than said first transformation layer.

15. A system according to claim 12 further comprising a filter to select a cell with a highest probability as the region of interest for the object.

16. A driver monitoring systems (DMS) comprising a system comprising an event camera, a memory for accumulating event information generated by the event camera and a processor configured to process said accumulated event information according to a method for producing a textural image from event information generated by an event camera comprising:
    accumulating event information from a plurality of events occurring during successive event cycles across a field of view of the event camera, each event indicating an x,y location within said field of view, a polarity for a change of detected light intensity incident at said x,y location and an event cycle at which said event occurred;

in response to selected event cycles, analysing event information for one or more preceding event cycles to identify one or more regions of interest bounding a respective object to be tracked; and responsive to a threshold event criterion for a region of interest being met, generating a textural image for the region of interest from event information accumulated from within the region of interest.

\* \* \* \* \*